United States Patent [19]
Delaney et al.

[11] 3,815,159
[45] June 11, 1974

[54] SEWERAGE TREATMENT SYSTEM

[75] Inventors: R. Edward Delaney, New Britain; Alan H. Cornish, Newington, both of Conn.

[73] Assignee: Koehler-Dayton Inc., New Britain, Conn.

[22] Filed: Nov. 8, 1972

[21] Appl. No.: 304,760

[52] U.S. Cl............................ 4/10, 4/131, 210/152, 210/195
[51] Int. Cl............................................. E03d 5/14
[58] Field of Search.......... 210/104, 152, 195; 4/10; 4/10

[56] References Cited
UNITED STATES PATENTS

| | | | |
|---|---|---|---|
| 3,112,497 | 12/1963 | Call..................................... | 4/10 X |
| 3,318,449 | 5/1967 | Jennings et al. .................... | 210/104 |
| 3,535,712 | 10/1970 | Zeff et al. ............................ | 4/10 |
| 3,633,218 | 6/1972 | Lekberg............................... | 4/10 |

*Primary Examiner*—Roy Lake
*Assistant Examiner*—Paul A. Bell
*Attorney, Agent, or Firm*—Spencer T. Smith

[57] ABSTRACT

A sewerage treatment system comprising a water closet, a bathing facility, first and second recirculating tanks each including filtering media for dividing the tanks into horizontally adjacent receptacle and filtrate compartments and a drain in the receptacle compartments thereof, means for selectively directing the effluent flushed from the water closet into the receptacle compartment of either recirculating tank, means for selectively directing the effluent from the bathing facility into either recirculating tank, means for selectively draining either recirculating tank, means for selectively recirculating the liquid in the filtrate compartment of either recirculating tank to the water closet for flushing same, means for operating the system in a first mode of operation wherein the effluent from the water closet is discharged into the receptacle compartment of the first recirculating tank, the liquid in the filtrate compartment of the first recirculating tank is selectively recirculated to the water closet, and the effluent from the bathing facility is discharged into the second recirculating tank, and means for alternately operating the system in a second mode of operation wherein the effluent from the water closet is discharged into the receptacle compartment of the second recirculating tank, the liquid in the filtrate compartment of the second recirculating tank is selectively recirculated to the water closet, and the effluent from the bathing facility is discharged into the first recirculating tank, and means for draining the first recirculating tank and for switching the system from the first mode of operation to the second mode of operation.

10 Claims, 1 Drawing Figure

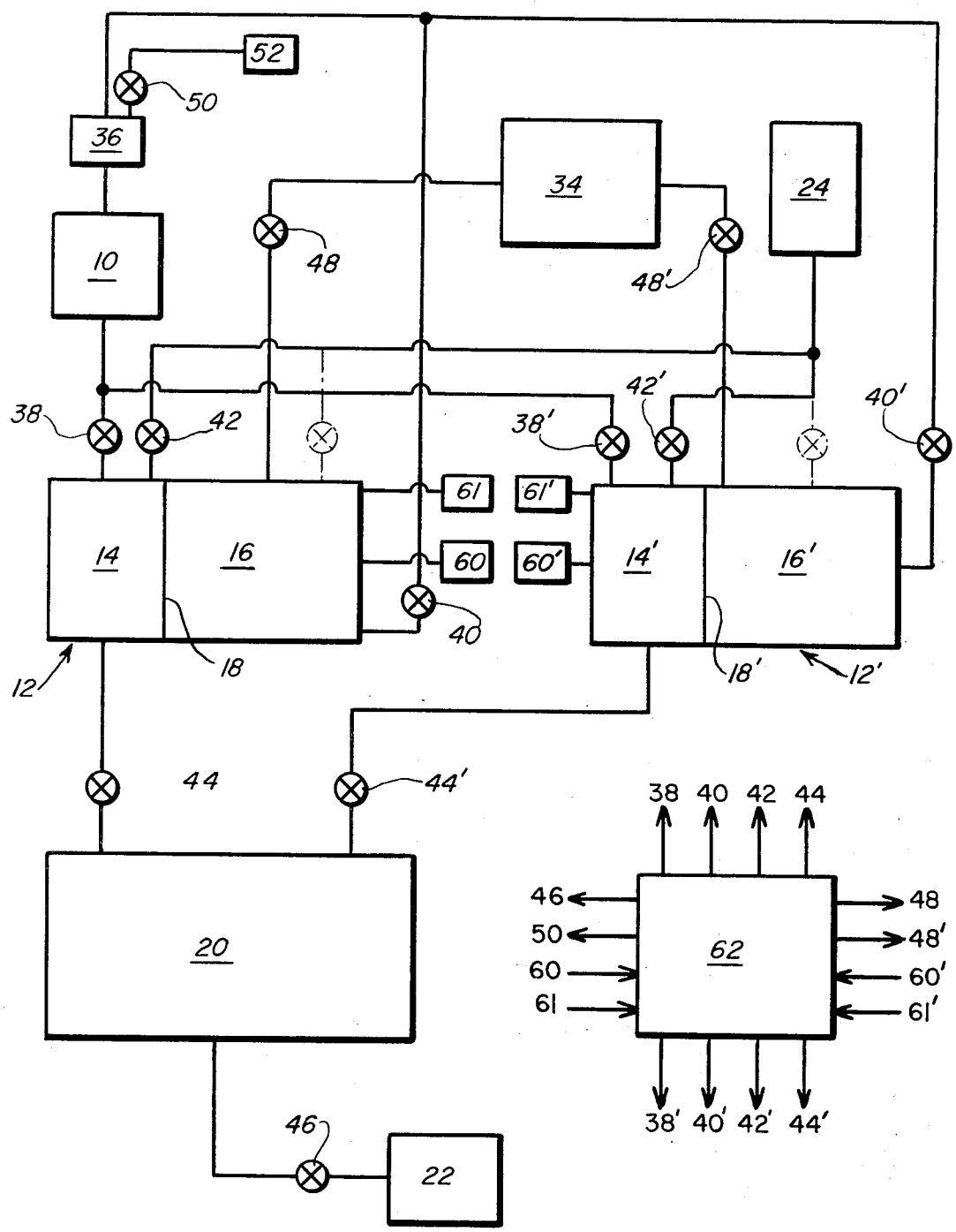

SEWERAGE TREATMENT SYSTEM

This invention relates to recirculating sewerage treatment systems wherein the effluent flushed from a water closet is discharged into a recirculating tank and a part of the liquid portion thereof is treated with odor and color control additives and periodically recirculated to flush the water closet.

Recirculating waste systems are quite commonly found in mobile environments such as aircraft, boats and other installations where immediate discharge of the effluent is not practicable. By recirculating the liquid portion of the effluent, the necessity of additionally storing the large quantities of liquid necessary for flushing the water closet is avoided.

When the receptacle compartment of a recirculating tank having horizontally adjacent receptacle and filtrate compartments which are separated by intermediate vertically extending filtering media is periodically drained, the liquid in the filtrate compartment flows through and backwashes the filtering media thereby cleansing the filtering media. Since the liquid in the filtrate compartment is drained to cleanse the filtering media, additional liquid conventionally has to be introduced into the recirculating tank subsequent to complete drainage so that sufficient liquid will be available to flush the water closet.

Such a sewerage treatment system must accordingly be taken out of service every time it is drained. Additionally clean water must be pumped into the recirculating tank to prime the system subsequent to each drainage and where there is no access to a water supply such priming water must be stored within the system.

Accordingly it is an object of the present invention to provide a recirculating sewerage treatment system which is continuously operable.

It is also an object of the present invention to provide a recirculating sewerage treatment system wherein pure drinking water is not required to prime the system prior to each cycle.

Among the advantages of the present invention is the provision of a sewerage treatment system of the recirculating type wherein the "gray" water of the system, i.e., the effluent from sinks and other drains can be utilized to periodically prime the recirculating tank.

Other objects and advantages of the present invention will become apparent from the following portion of this specification and from the accompanying drawing which illustrates in accord with the mandate of the patent statutes a presently preferred embodiment incorporating the principles of the invention.

Referring to the drawing:

The sole drawing is a diagrammatic representation of the sewerage treatment system made in accordance with the teachings of the present invention.

The recirculating sewerage system includes one or more water closets 10 which may be either toilets or urinals, a first recirculating tank 12 having horizontally adjacent receptacle 14 and filtrate 16 compartments which are separated by vertically extending filtering media 18, a storage tank 20, an incinerator 22, a bathing facility 24 which may be either one or a plurality of basins, drains, shower cabinets, bathtubs or the like, a second recirculating tank 12' having horizontally adjacent receptacle 14' and filtrate 16' compartments which are separated by vertically extending filtering media 18', a reservoir of makeup liquid 34 which may, if the system is installed in a ship, be the sea itself, a flush pump 36, a plurality of selectively actuatable valves 38, 38', 40, 40', 42, 42', 44, 44', 46, 48, 48', and 50, sensors 60, 61 for sensing the fluid level in the recirculating tanks and a master valve control center 62 for selectively actuating these valves.

In operation valve water closet drain valve 38, recirculating tank recirculation valve 40 and bathing facility drain valve 42' are initially opened and the remaining valves are closed. Makeup liquid is discharged from the reservoir 34 through a makeup liquid control valve 48 into the first recirculating tank 12 in order that liquid will be available for flushing the water closet 10. This level will vary with existing service conditions (peak passenger loading would naturally require a higher liquid prime level than would be required for minimum passenger loading) and is preferably predetermined so as to satisfy all service conditions (approximately 50 percent full) when this predetermined level is sensed by sensor 60 valve control center 62 closes this makeup liquid control valve. The system is then operational. Utilization of the water closet 10 results in the flush pump 36 being energized and liquid from the filtrate compartment 16 of the first recirculating tank being pumped under pressure into the water closet 10 flushing same. The flushed effluent is discharged into the receptacle compartment 14 of this recirculating tank 12 and a portion of the liquid effluent filters through the filtering media into the filtrate compartment 16. If desired, odor and color control additives can be selectively discharged from a suitable reservoir 52 through a selectively actuatable additive control valve 50 into this recirculated liquid stream. The effluent from the bathing facility 24 is discharged through the gray water control valve 42' into the second recirculating tank 12' where it is temporarily collected.

While this recirculation process is in operation, all the plumbing drain water throughout the vessel, including sink drains, shower drains, water used in the food concession areas, and the like is collected in the second recirculating tank 12'. Since the only volume added to the first tank which receives the waste from the water closets is human waste, there is a relatively slow increase in volume. On the other hand, the volume contained by the second recirculating tank which receives the plumbing drain water normally increases at a much higher rate. When the second recirculating tank 12' is filled to the above-discussed predetermined level (preferably approximately 50 percent full), the sensor 60' activates conventional valve control means 62. Recirculating tank drain valve 44 is opened and the first recirculating tank is completely drained into a storage tank 20. Concurrently therewith valves 38, 40 and 42' are closed and valves 38', 40' and 42 are opened. Recirculating tank drain valve 44 is again closed after the recirculating tank has been completely drained. The two recirculating tanks are accordingly concurrently switched in operation and the system is thereby continuously operable. The second recirculating tank 12' receives the waste from the water closets and urinals and the first recirculating tank 12 starts to accummulate the plumbing drain or gray water for the next cycle of operation.

In the unusual event that the waste receiving recirculating tank is filled up prior to a liquid level being reached in the gray water receiving receptacle tank which will be sensed by sensor 60' to switch the mode of operation of the two recirculating tanks, sensor 61 will sense that the waste receiving tank is filled and control center 62 will open makeup water valve 48' until enough makeup water has been introduced into the gray water recirculating tank to raise the liquid level therein to the predetermined level (50 percent) whereby the waste receiving recirculating tank will be drained and the mode of operation of the two recirculating tanks will be reversed.

Periodically, storage tank control valve 46 is opened and the storage tank 20 is emptied into the incinerator 22 where the burning of waste takes place. A sanitary hygienically clean ash is produced which is easily removed at the base of the incinerator either by sweeping it into a container or by picking it up with a vacuum machine.

The system will continue to periodically switch from the first mode of operation to the second mode of operation and from the second mode of operation to the first mode of operation as the sensor 60, 60' which is associated with the particular recirculating tank 12, 12' which is at the moment receiving the gray water from the bathing facilities 24 senses a predetermined fluid level in that recirculating tank.

While in the preferred embodiment the grey water is discharged into the receptacle compartments 14, 14' of the recirculating tanks it may be alternatively discharged into the filtrate compartments 16, 16' as shown in dotted lines above the recirculating tanks.

Having thus described our invention, we claim:

1. A sewerage treatment system comprising water closet means,
   bathing facility means,
   first and second recirculating tanks each including filtering media for dividing said tanks into horizontally adjacent receptacle and filtrate compartments and drain means in the receptacle compartments thereof,
   means for selectively directing the effluent flushed from said water closet means into the receptacle compartment of either of said first or second recirculating tanks,
   means for selectively directing the effluent from said bathing facility means into either of said first or second recirculating tanks,
   means for selectively draining either of said first or second recirculating tanks,
   means for selectively recirculating the liquid in the filtrate compartment of either of said first or second recirculating tanks to said water closet means for flushing same,
   means for operating the system in a first mode of operation wherein
   the effluent from said water closet means is discharged into the receptacle compartment of one of said recirculating tanks,
   the liquid in the filtrate compartment of said one recirculating tank is selectively recirculated to said water closet means, and
   the effluent from said bathing facility means is discharged into the other one of said recirculating tanks, and
   means for alternately operating the system in a second mode of operation wherein
   the effluent from said water closet means is discharged into the receptacle compartment of said other recirculating tank,
   the liquid in the filtrate compartment of said other recirculating tank is selectively recirculated to said water closet means, and
   the effluent from said bathing facility means is discharged into said one recirculating tank, and
   means for draining said first recirculating tank and for switching the system from said first mode of operation to said second mode of operation when a selected liquid level is reached in said other recirculating tank.

2. A sewerage treatment system according to claim 1, further comprising
   means for draining said other recirculating tank and for switching the system from said second mode of operation to said first mode of operation when said selected liquid level is reached in said one recirculating tank.

3. A sewerage treatment system according to claim 1, further comprising
   means for sensing when the liquid level in said other recirculating tank reaches said selected level when the system is operating in said first mode of operation and draining said first recirculating tank and for switching the system from said first mode of operation to said second mode of operation.

4. A sewerage treatment system according to claim 3, further comprising means for sensing when the liquid level in said one recirculating tank reaches said selected level when the system is operating in said second mode of operation and for draining said second recirculating tank and for switching the system from said second to said first mode of operation.

5. A sewerage treatment system according to claim 1, wherein said water closet means comprises a plurality of toilets and/or urinals.

6. A sewerage treatment system according to claim 1, wherein said bathing apparatus means comprises a plurality of sinks and/or liquid drains.

7. A sewerage treatment system according to claim 1 further comprising
   holding tank means,
   means for directing the drainage from said recirculating tanks into said holding tank means.

8. A sewerage treatment system according to claim 3, further comprising
   a source of makeup water and means for selectively introducing at least a portion thereof into either of said first or said second recirculating tanks.

9. A sewerage treatment system according to claim 8, further comprising second means for sensing when the fluid level in said one recirculating tank during the first mode of operation substantially reaches the top thereof and for actuating said introducing means until the liquid level in said other recirculating tank reaches said selected level.

10. A sewerage treatment system according to claim 1, further comprising a source of odor and/or color control additives and means for selectively introducing a portion thereof into the system.

* * * * *